Nov. 10, 1931.  C. D. ALLEN  1,831,732
MULTIPLE GAUGE SECTIONAL EXTENSIBLE HOUSING
Filed Sept. 6, 1929  5 Sheets-Sheet 1
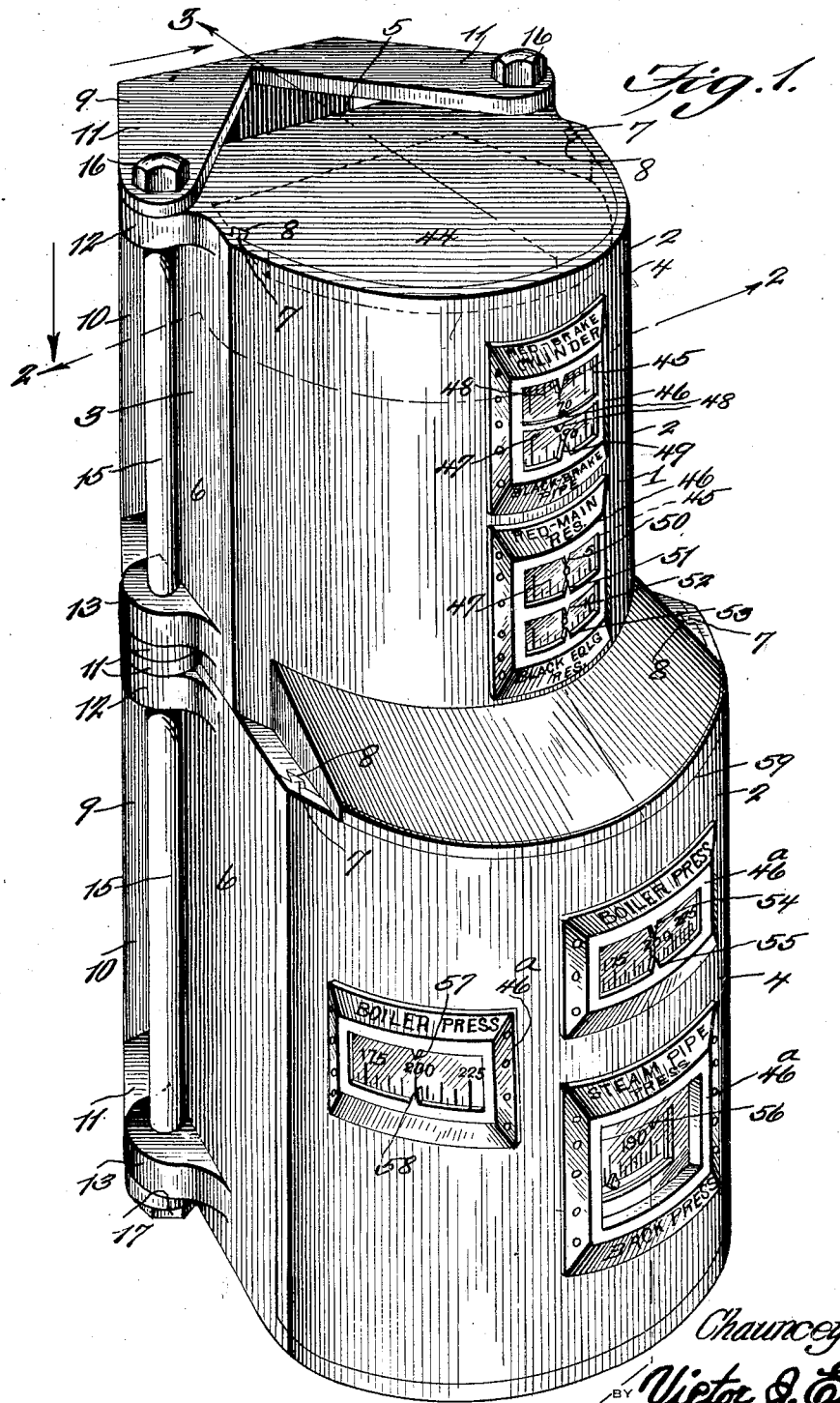

Nov. 10, 1931. C. D. ALLEN 1,831,732
MULTIPLE GAUGE SECTIONAL EXTENSIBLE HOUSING
Filed Sept. 6, 1929 5 Sheets-Sheet 2
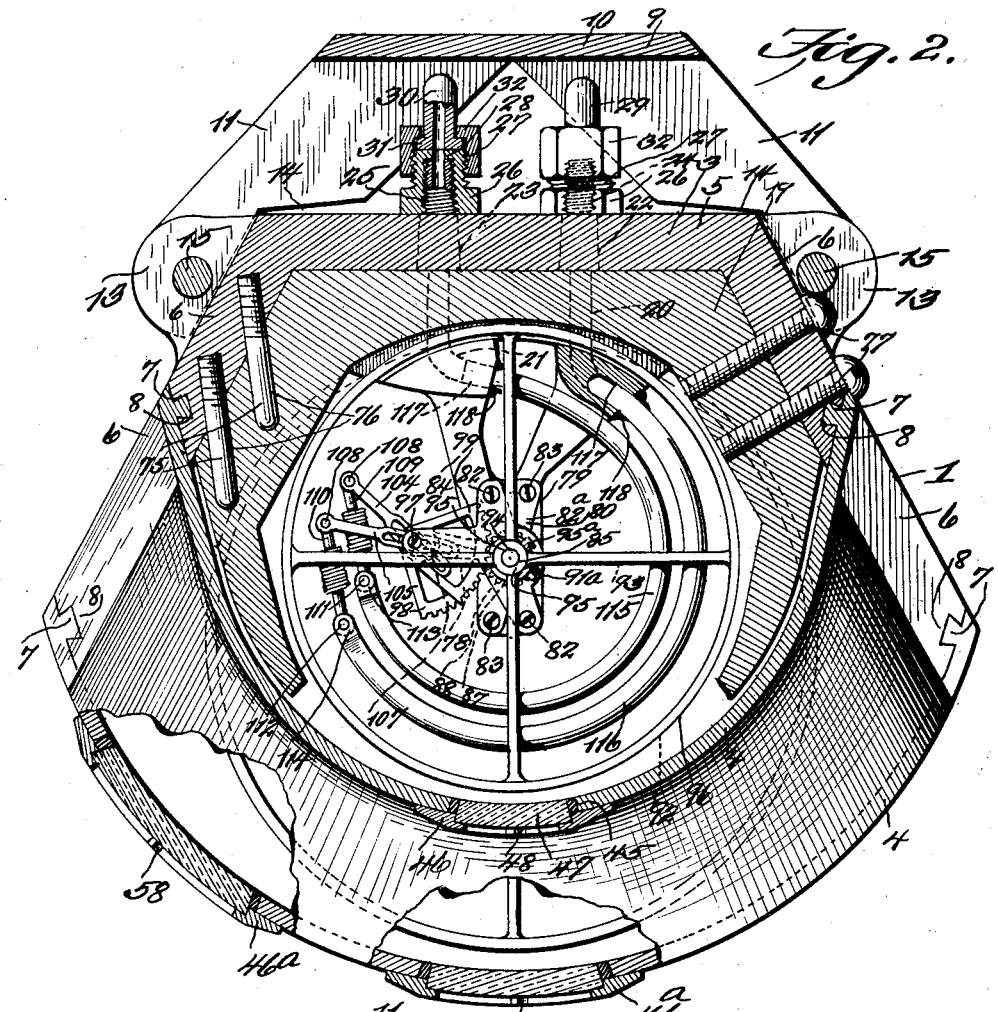
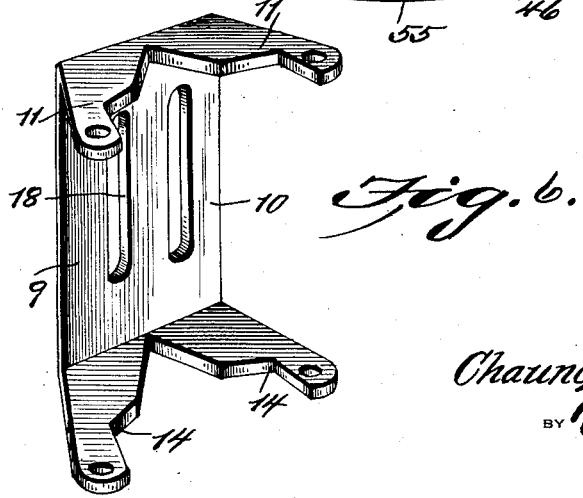

Nov. 10, 1931.  C. D. ALLEN  1,831,732
MULTIPLE GAUGE SECTIONAL EXTENSIBLE HOUSING
Filed Sept. 6, 1929  5 Sheets-Sheet 3

Chauncey D. Allen
INVENTOR

BY Victor J. Evans
ATTORNEY

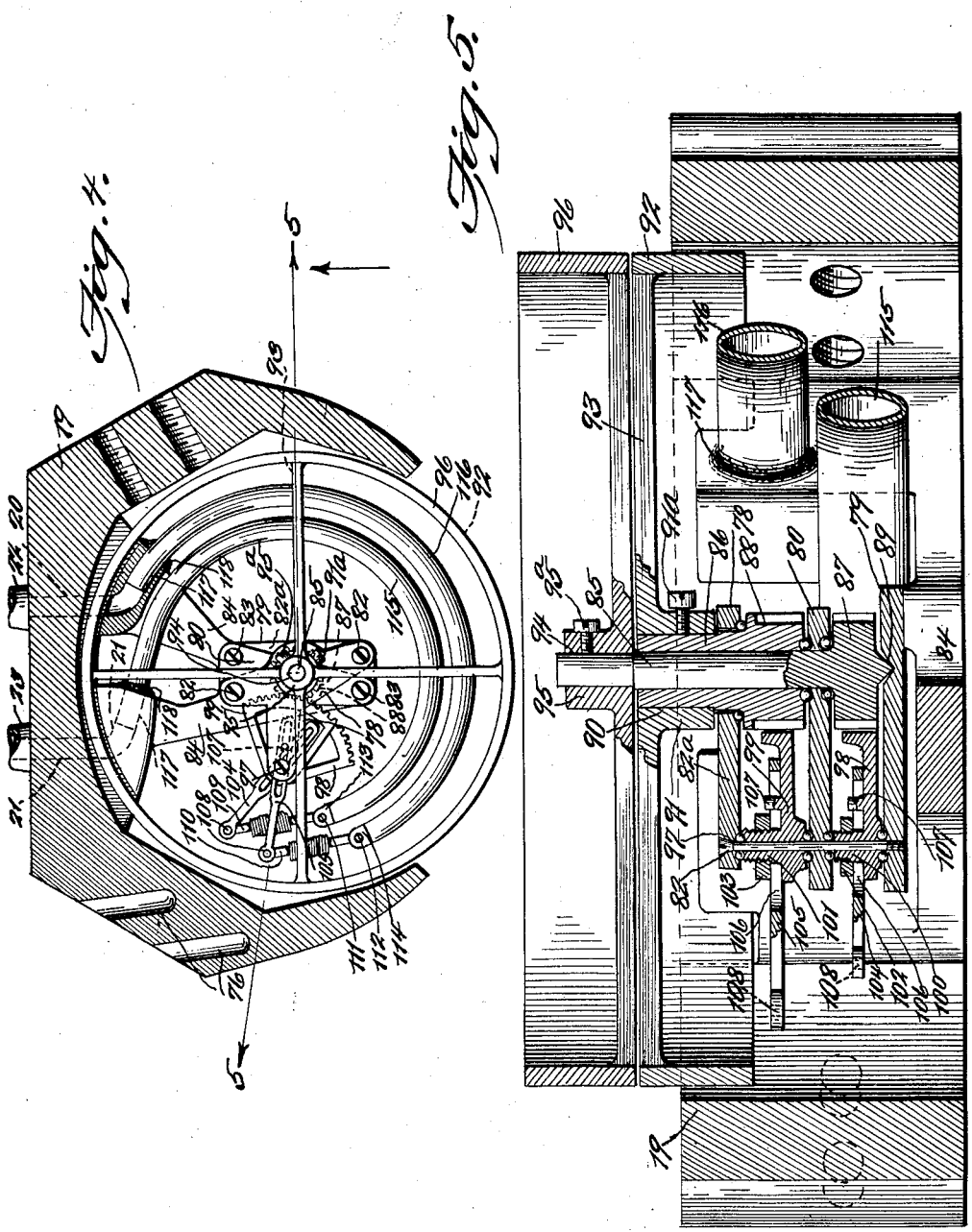

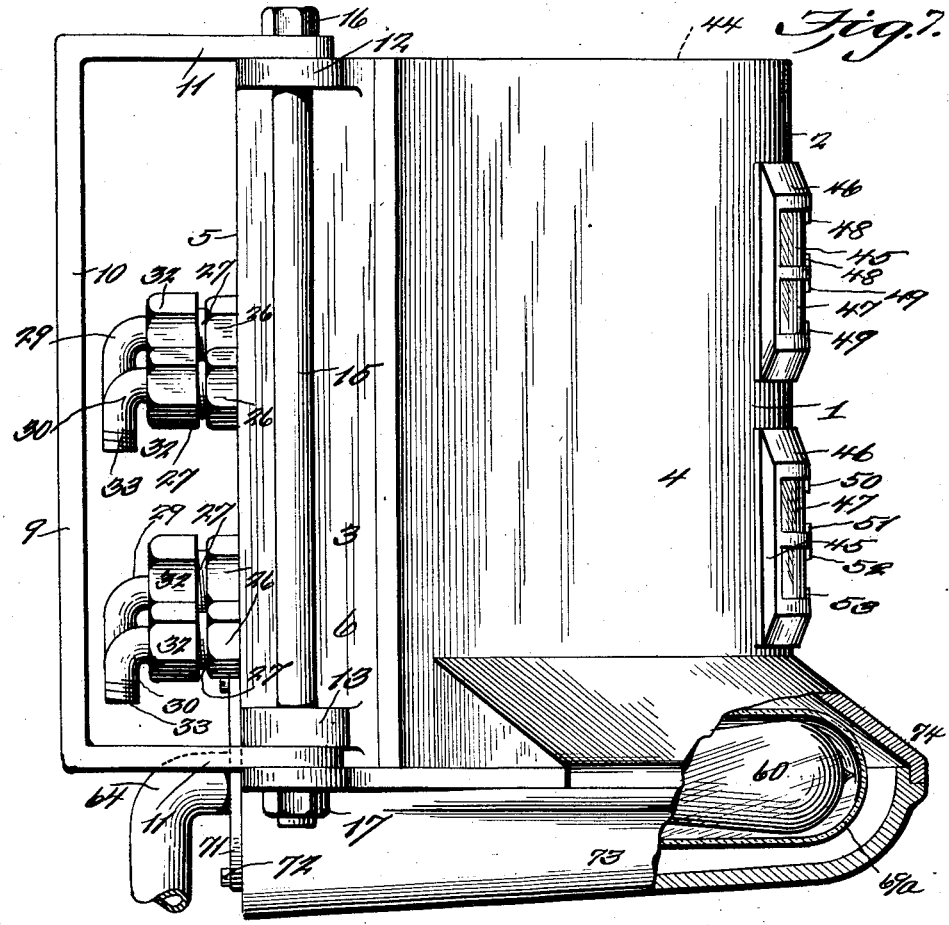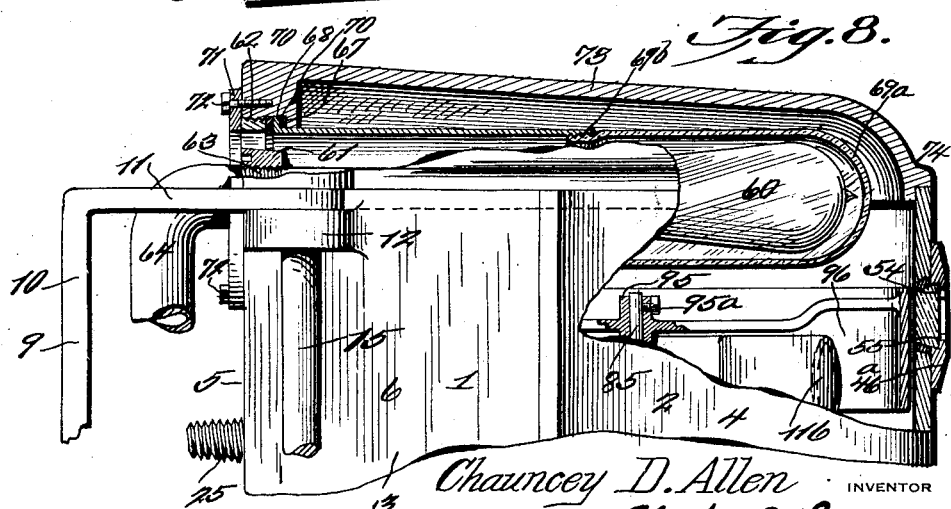

Patented Nov. 10, 1931

1,831,732

UNITED STATES PATENT OFFICE

CHAUNCEY D. ALLEN, OF GERMANTOWN, PENNSYLVANIA, ASSIGNOR TO CONSOLIDATED ASHCROFT HANCOCK COMPANY, INC., OF NEW YORK, N. Y., A CORPORATION OF NEW YORK

MULTIPLE GAUGE SECTIONAL EXTENSIBLE HOUSING

Application filed September 6, 1929. Serial No. 390,759.

The present invention relates to the art of housings for gauges, such as will give various readings of pressure and the like, and more especially to an improved multiple sectional extensible housing, for encasing a plurality of gauges.

Various gauges used in cabs on locomotives and elsewhere are disposed in various locations, certain of the gauges for the engineer to read and certain of the gauges for the fireman to read, necessitating looking from one to the other in order to ascertain the different pressures, there having been, in the construction of locomotive equipment, little attempt to group the gauges, and to so arrange them as to make them more easily readable either by the engineer or fireman or both.

Furthermore pressure gauges now in use involve readings in a circular direction disposed in a vertical plane, for instance as would be the case in reading a circular dial.

Therefore it is the purpose of the present invention to provide an improved multiple sectional extensible housing for encasing a plurality of gauges with dial band readings, and while it is the aim to provide revoluble dial bands operable horizontally for indicating fluid pressure in pounds or inches, it is to be understood that the dial bands may rotate vertically.

Another purpose, is to provide, in a device of this kind, a construction of multiple sectional extensible housing, such as will group a plurality of gauges having horizontal dial bands or pointers indicating the variations in fluid pressure, that is relative to vacuum or degrees of temperature, and whereby the fluid pressure is readable from one, two or more or various angles.

In a multiple extensible sectional housing of this kind, it is the purpose to house a plurality of gauges, having the readings or calibrations on the dial bands appearing through front and side window-lights, which may have magnifying glass protectors, though not necessarily, whereby the readings or calibrations are easily discernible from one or more positions.

It is another purpose to provide, in a gauge housing of the multiple sectional extensible kind, means for releasing pressure automatically from the housing in case of breakage or leakage of the socket base or tube springs, thereby preventing damaging the housing.

Heretofore with gauges now in use, a great deal of difficulty is experienced in removing and applying the gauges, especially as a maintenance problem. To overcome this difficulty it is the aim to house the gauges in a group, so arranging the housing on the boiler head as to permit it to be removed with the gauges therein as a unit, or to permit the gauges to be removed individually, the work and operations to effect this result being relatively very easy, due to the fact that the dowel pins and screws which removably secure the gauges in the housing are easily accessible. The removal of the gauges individually may be accomplished without removing the housing.

In a housing of this kind it is another purpose to provide internal illumination, for example a removably attached electric lamp bulb including a transparent protector, whereby the interior of the housing may be illuminated, so that the various readings on the several gauges are easily discernible through the window-light openings, by the use of one light instead of a light for each gauge reading as at present. In connection with the illuminating means, the interior of the transparent protector may be ventilated, thereby avoiding accumulation of heat, not only interiorly of the protector, but also interiorly of the housing.

It is another purpose to provide a gauge housing of this kind, so mounted on a bracket carried on the boiler head plate as to permit the removal of the top or bottom sections of the housing without removing the other sections.

It is another purpose to provide a gauge housing with one or more gauges therein, with indicating pointers or bands so arranged as to show the relative movement toward or from a given point, when changes are made in the vacuum or pressure chambers.

Another purpose is to provide a gauge housing with one or more gauges having dial bands indicating pressure in a chamber and a pointer for indicating pressure in a second adjacent chamber; said pointer having its starting or zero position at a point where the dial band stops.

In a gauge housing of the multiple sectional type, it is the purpose to provide one or more gauge sockets directly connected to water expansion chambers as a part of the socket for cooling.

Another purpose is to provide a housing with one or more gauge movements so associated with the tube springs by means of flexible spring links, so adjustable by hand or tool without removing sockets, dial bands or movements from the gauge housing.

A further purpose is to provide a gauge housing with changeable gauge units having sockets, movement and dial band shield, so relatively associated into one unit as to permit of removal without disconnecting the other units.

A still further purpose is to provide a gauge housing, which is dust and water proof, in order to avoid hindering the gauges in their operations.

A still further purpose is to provide a gauge housing with a safety device, such as a pressure escaping element or valve, such as will avoid accidents, should the tube springs burst.

A further purpose is to provide in a gauge housing, a multiple or double vision means, whereby certain of the gauges are discernible by either the engineer or fireman, or by both.

A further purpose is to provide a multiple sectional gauge housing, wherein the various sections of the housing are removable individually, or as a unit, and wherein the gauges therein are removable individually.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in perspective of the improved multiple sectional gauge housing, showing the readings of the various gauges appearing through the various window-light openings, and illustrating the bracket arrangement for mounting the housing on the boiler head plate.

Figure 2 is a horizontal sectional view on line 2—2 of Figure 1.

Figure 4 is a horizontal sectional view through one of the gauges, showing a supporting plate and illustrating the tube springs and the dial bands.

Figure 5 is a sectional view on line 5—5 of Figure 4.

Figure 6 is a detail view of one of the brackets for supporting a section of the housing.

Figure 7 is a view in side elevation of the uppermost section of the housing illustrating a cover for the lower end of the section, and which cover can be used for the top of a lower section.

Figure 8 is a view in side elevation of the upper end of a lower section of the housing illustrating the same cover in Figure 7, showing how it connects with the upper portion of said lower section.

Figure 3:
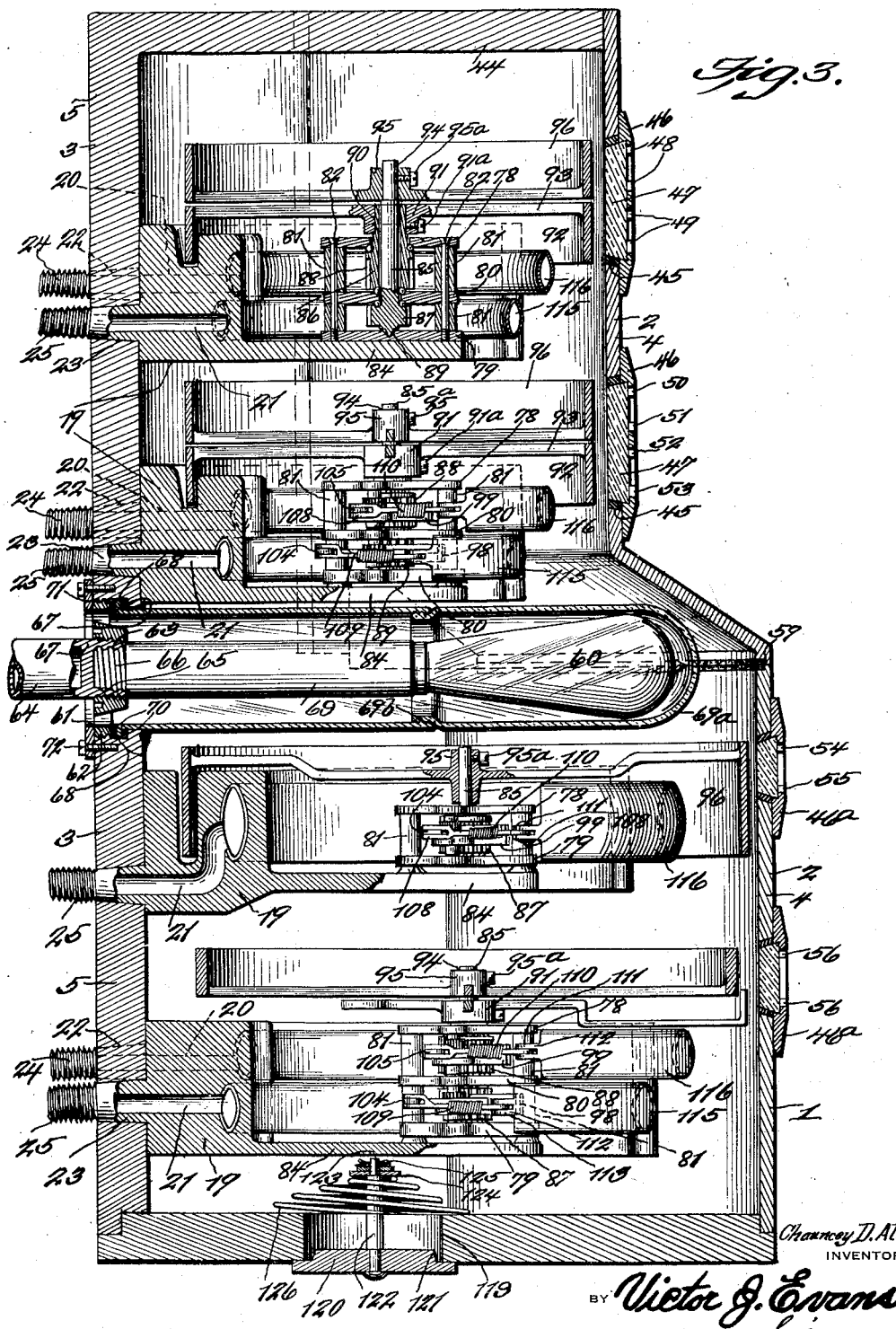
Figure 3 is a vertical sectional view on line 3—3 of Figure 1.

Referring to the drawings, 1 identifies the gauge housing as a whole, which may comprise one or a multiple of sections 2. Each section may be made of any shape or configuration preferably of the contour illustrated in Figure 1. Also the sections may be made of any proportions, such as will accommodate the housing of the necessary gauges now used. It is obvious that should the gauges be revoluble in a vertical direction, possibly in lieu of being horizontally revoluble as shown, the various sections of the housing may be shaped accordingly, in order to accommodate the dial bands and the various gauge parts.

As shown the various sections are superimposed, and one section is larger than another section, though it might be possible to make them all of the same size.

While it is believed preferable to arrange the sections super-imposed, it might be possible to arrange the sections side by side in a horizontal direction instead of in a vertical direction.

As illustrated each section comprises a rear part 3 and a front part 4. The rear part comprises a rear wall 5 and the diverging side walls 6, thereby affording a rear part of angular formation in cross section, namely semi-polygonal in cross section.

The front or forward part is arcuate in cross section, and the inner face of each of the front parts 4 adjacent its edge portions is provided with dove tailed tongues 7, which slidably engage with the dove tail grooves 8 formed on the edges of the diverging walls 6 of the rear part of the housing. The cover or front part 4, therefore slidably engages with the rear part, due to the dovetailed joints.

As previously stated the lower section of the housing, while being of the same shape or contour as the upper section, is larger in size, therefore it projects beyond the front of the upper section.

In order to support these sections in position super-imposed, and in order to be mounted on the boiler head plate, suitable brackets 9 are provided. Preferably these brackets are constructed from plate metal, more clearly shown in Figure 6, each comprising a body plate 10 and the diverging arms 11. These arms 11 may be any length and width, and of such shape as will accommodate the supporting of the section. Preferably the arms over or under lie the sections of the housing. For each section a bracket may be provided, and since the arms overlie and underlie the opposite ends of the back part of each section, said arms also cooperate with lugs 12 and 13 which project laterally from the sides 6 of the back part near the upper and lower ends of the section. The arms which engage between the lugs, where the sections join each other, are cut away as identified at 14, so that the arms may engage over the corners of the back parts of the sections.

Elongated bolts or rods 15 pass vertically through the lugs, the nuts 16 engaging the uppermost arms, and nuts 17 are threaded to the lower ends of the bolts or rods, whereby the sections may be joined together in superimposed positions.

The brackets have their body plates provided with elongated slots 18, through which any suitable fastening means or bolts (not shown) may pass for securing the brackets to the boiler head plate in rigid position so as to insure rigidity for the sections. The slots 18 are elongated in order to permit of proper adjustment of the brackets and the sections carried thereby in their arranged positions.

A plurality of body plates are arranged in the housing and are supported on the back wall 5 of the rear part of the housing. There are two body plates 19 in each of the sections of the housing and are provided with passages 20 and 21, the rear portions of which are formed or extended through bosses 22 and 23, which fit through the back wall of the rear part of the housing. These bosses are tapered, and substantially half their length are smooth and simply fit through the back wall 5, while the other half of the bosses are threaded as identified at 24 and 25.

Suitable fittings 26 are threaded to the bosses against the rear face of the back wall 5 of the rear part, in order to tighten the bosses in position and hold the body plates fixed rigid in the housing. The fittings or nuts 26 have threaded extensions 27, the ends of which are provided with openings 28 registering with the rear portions of the passages 20 and 21. Elbows 29 and 30 have their flanged ends 31 connected to the rear ends of the extensions 27, by means of nuts 32, which are fitted over the elbows as shown. The nuts 32 are fitted over the elbows and engage with the flanged ends 31 of the elbows, thereby holding the flanged ends in position.

Any suitable piping or tubes (not shown) may be connected to the exteriorly threaded ends 33 of the elbows, whereby the various gauges may be connected to the various sources of pressure.

Referring to the uppermost section of the housing, preferably as shown in Figure 1 of the drawings, the uppermost section includes a top wall 44, which is made integral with the diverging sides 6 of the rear section of the housing, and also integral with the back wall of the rear part. This upper wall 44 fits within the arcuate forward part of the section, and conforms to the curvature of the forward part of the section.

The forward part 4 of the uppermost section is provided with a plurality of window-light openings 45 including exterior frames 46 to secure the transparencies 47 in position. These transparencies may be constructed of any suitable material such as glass either plain plate or magnifying type, celluloid or the like, through which the calibrations, degrees or readings are readily visible, that is the readings on the dial bands. The frames 46 for holding the transparencies in position have indicators 48, 49, 50, 51, 52 and 53 for the uppermost section, while the similar frames 46a of the lower section of the housing have indicators or pointers 54, 55, 56, 57 and 58. These pointers or indicators are for the purpose of cooperation with the degrees or calibrations on the dials of the gauges in the housing. The various frames for the window-light openings may be any shape, configuration, preferably in the present instance they are beveled, and cut, engraved or otherwise applied to the upper and lower bevels of these various frames or identifications for the various pressure gauges. These identifications are as follows:

"Red-brake cylinder"; "Black-brake pipe"; "Red-main res."; "Black eqlg. res."; "Boiler press"; "Steam pipe press"; "Back press" and "Boiler press". It is obvious that the housing may comprise a single section or two or more sections, in fact as many sections as there are pressures to be read.

The various sections may be joined together as shown at 59. Where the sections are joined, an electric lamp 60 is located, there being a spider 61 threaded in an opening 62 in the back wall of the housing. This spider is for the purpose of permitting air to circulate around the lamp or bulb, and also serves as a means for the reception of the threaded end 63 of a pipe or tube 64, such as BX, for the purpose of encasing or carrying electrical conducting wires (not shown) to the socket 65 formed in the tube 64, and into which the screw plug end 66 of the lamp is threaded.

The spider as previously stated is threaded in an opening, and it is to be noted that this opening has an annular rabbit 67, for the reception of a flange 68 of a shield, guard or cover 69, which houses the lamp or bulb, as a protecting element. The outer portion 69a (which is threaded at 69b to a metal portion) is transparent, and may be constructed of glass, celluloid or xylonite. The flange 68 is mounted betwen suitable packing rings 70, which together with the flange 68 are held in place by means of the spider, which allows a circulation of air to enter the shield and around the exterior of the lamp or bulb, to insure against excessive heat.

A suitable ring plate 71 is secured by screws or the like 72 to the back wall of the housing, where the two sections therof are joined. This ring plate covers a marginal portion of the spider to prevent its accidental rotation. At the same time the ring plate acts as a means for retaining the back portions of the two sections of the housing joined together.

As shown clearly in Figures 7 and 8 the uppermost and a lower section of the housing are separately illustrated, and in this instance a closure or cover 73 is provided, which is capable of fitting the lower end of the uppermost section, or the upper end of said lower section, and in such an instance a securing flange 74 of the cover cooperates with the edge of the forward part of the section.

The body plates 19 are enlarged at their rear portions, and while the housing and such body plates may be any configuration, they are preferably of the shape as illustrated. In any case the body plates are to be of a shape or contour to fit within the rear part of each section and behind the forward part. The diverging flanges of the rear part, on one side of the housing have threaded therein dowel pins 75, which enter bores 76 on one side of a body plate, while screws 77 are threaded through the opposite side of the back part of each section and into the opposite side of each body plate. It is to be noted that the dowel pins are so positioned that when the screws 77 are removed the body plate may be easily removed in a forward direction, that is after slidably removing the forward part of the section of the housing.

In this manner any of the gauges or units thereof may be easily removed individually. The dowel pins 75 act to guide the body plates 19 into place, while the screws 77 secure the body plates in their proper positions. It will be noted upon examining Figures 2 and 4 that these body plates are of polygonal design or contour, and that they encircle the greater portions of the dial bands, more or less as a protection to the bands, especially when inserting or removing the gauges.

Each of the gauges, there being a multiple of them, is of similar construction. However the gauges in the uppermost section of the housing are of less size than those in the lower section of the housing.

As previously stated each of the body plates support gauge mechanisms as a unit. In each instance the gauge mechanisms comprise upper and lower and intermediate plates 78, 79 and 80, the intermediate plate being spaced in between the upper and lower plates 78 and 79 by means of the spacing sleeves 81, through which the screws 82 pass for holding the plates rigidly in position and thereby constituting a frame 82a. This frame 82a is secured by screws 83 to a radial web projection 84, which is arranged radially from the body plate and cast integrally therewith.

Supported in this frame are inner and outer telescoping shafts 85 and 86, the lower portion of the inner shaft is provided with a gear or pinion 87, while the lower end of the outer tubular shaft has an integral pinion or gear 88. The lower end of the inner shaft 85 is mounted in a suitable thrust bearing 89. The upper end of the outer tubular shaft 86 is machined at 90 to receive the hub 91 of a gauge dial band 92, held in position by set screw 91a. The hub 91 projects axially from the web united spokes 93 of the band. The upper end of the inner shaft 85 is likewise machined, and fitted thereon at 94 to be retained in position by set screw 95a is the hub 95 of the gauge dial band 96. These dial bands are similar in each instance, that is insofar as their construction is concerned, as pertaining to the gauges encased in the housing.

Mounted in the frame 82a is a screw 97 which constitutes a pivot for the quadrants 98 and 99, which mesh respectively with the pinions or gears 87 and 88. These quadrants are of conventional type, and while mounted as herein shown and described, it is obvious that they may be mounted similar to those now used in various gauges where the readings of the dials are circular.

Obviously when the quadrants are oscillated movement is imparted to the gears or pinions 87 and 88 and since the dial bands 92 and 96 are carried by the shafts 85 and 86, the perimeters of the dial bands will move past the window light openings, and since the perimeters carry the graduations or calibrations, they are easily visible through said openings.

The quadrants in the present instance have hubs 100 and 101, on which holding nuts 102 and 103 are threaded. These nuts act to secure extension arms 104 and 105 on the quadrants. The fact is these arms have slots 106 through which the hubs 100 and 101 engage. Also suitable lugs 107 which rise from the quadrants engage through the slots, thereby holding the extension arms against oscillating movement with respect to the quadrants, and by tightening up on the nuts 102 and 103 the arms may be held in different adjusted radial positions.

Connected pivotally to the arms as at 108 are spring links 109 and 110, which are in turn pivotally connected at 111 and 112 to arms 113 and 114, which are integral with the terminals of the tube springs 115 and 116. These tube springs have their interiors communicating with the passages 20 and 21 formed through the body plate 19. The fact is the tube springs are of circular or arcuate contour as shown in the cross sectional view in Figure 2, and their ends opposite those connected to the spring links fit within the passages 20 and 21 as at 117. Where this engagement or fitting occurs, the tube springs are soldered, screwed or otherwise fastened in place as at 118.

The elbows 29 and 30 are connected by means of pipes not shown with a source of pressure, such as pressure in the red-brake cylinder, black-brake pipe, red-main reservoir, black-equalizing reservoir, boiler pressure, steam pipe, or back pressure, such pressure will cause an expansion of the tube springs 115 and 116. When these tube springs expand or contract, the quadrants in turn oscillate and will therefore impart movement to the gears 87 and 88 and hence cause the shafts 85 and 86 to rotate, and consequently impart rotation to the dial bands 92 and 96, the graduations or calibrations on the bands will then cooperate with the various pointers or indicators 48 and 49, 50, 51, 52, 53, and 54, 55, 56, 57 and 58. The fact is the housing contains a multiple of gauges, in fact eight, there being two dial bands, in groups of twos, the tube springs in each instance being connected with a source of pressure, according to the indications on the face of the housing.

It is to be noted that the manner in which this housing is put together in sections, the construction thereof being as illustrated, the housing is dust proof and is interiorly illuminated. Furthermore to provide for the prevention of accidents in case of the tube springs bursting, or otherwise causing pressure on the interior of the housing, the wall of the housing, preferably at the bottom an opening 119 is provided, closed by a valve plate 120. This valve plate has a shoulder extension 121 extending partially into the opening 119, and the valve plate is carried by a headed pin 122. The inner end of the pin has a reduced extension 123, which is rectangular in cross section, there being a circular plate 124 fitted to the extension, and to retain the circular plate in position a suitable dowel pin 125 passes transversely of the extension 123. A helical coil spring 126 is interposed between the circular plate 124 and the bottom of the housing. This spring acts to hold the valve plate 120 closed. Obviously should there be any pressure of any kind on the interior of the housing due to the bursting of any of the tube springs, or pressure otherwise created, the valve plate will automatically unseat and permit of the escape of the pressure. It is to be noted that the cover 73 whether it is used as the top of the bottom section or the bottom of the upper sections of the housing, may be likewise equipped with a valve plate similar to 120, in order to permit of the escape of pressure.

It is obvious that this multiple sectional extensible gauge housing, while described and illustrated to be used in a vertical position, that is can be disposed in a horizontal position, thereby enabling the readings to be vertical as well as horizontal.

It is also obvious that by the removal of one or the other of the bolts 15 the sections of the housing can be swung horizontally on the remaining bolts. Furthermore by removing the front plate covers access may be had to the gauges, permitting them to be removed individually or collectively, and while the front plate covers are removed, and one of the bolts 15 removed either one of the sections of the housing can be swung horizontally on the remaining bolt without disturbing the other section.

The invention having been set forth, what is claimed is:

1. A multiple extensible housing for pressure or vacuum gauges having dial bands revoluble on an axis perpendicularly of the housing, the front of the housing having a plurality of openings with transparencies therein to permit of the readings of the dial bands transversely of the face of the housing.

2. A multiple sectional extensible housing having a multiple of gauges therein, said gauges comprising pressure or vacuum indicators revoluble on an axis perpendicularly of the housing, the front of the housing having transparent covered openings, whereby the readings on the indicators are visible and readable in a direction transversely of the housing.

3. A multiple sectional extensible housing housing a multiple of gauges therein, said gauges comprising pressure or vacuum indicators revoluble on an axis perpendicularly of the housing, the front of the housing having transparent covered openings, whereby the readings on the indicators are visible and readable in a direction transversely of the housing, said transparent covered openings being disposed, whereby the readings on the indicators are visible and readable from two or more angles.

4. A multiple sectional extensible housing, a plurality of gauges operable therein, said gauges comprising indicators for indicating pressure or vacuum, the indicators being revoluble on an axis perpendicularly of the housing, whereby the indicator readings are visible in a direction transversely of the housing, the front of the housing being removable in sections, permitting access to the gauges collectively or individually.

5. A gauge housing comprising a multiple of sections, the sections being super-imposed, means for the support of each section, and means for connecting the sections to the supporting means, whereby a lowermost section may be removed without disturbing the sections above, and a plurality of gauges carried within the housing.

6. In a gauge housing, a multiple of housing sections, means for supporting the sections superposed, a plurality of gauges comprising indicators mounted in each section, a front cover plate for each section having a slidable connection with the section and provided with transparent covered openings to permit gauge readings visible there through, a plurality of gauges in each section, means for supporting the gauges in groups in each section, said gauge supporting means conforming to the transverse contour of the housing, and means for connecting said supporting means to the back of the housing whereby the gauges are removable collectively or individually from the front of the housing by first removing the front cover plate.

7. In a gauge housing, a plurality of interunited sections, means for connecting the sections whereby one may be removed and disassembled without disturbing the other, a plurality of gauges in each section and arranged in groups, said gauges having indicators including graduations and being revoluble whereby the graduations are readable in a direction transversely of the housing, a cover plate for each section with transparent covered openings rendering the graduations visible.

8. In a gauge housing, a plurality of interunited sections, means for connecting the sections whereby one may be removed and disassembled without disturbing the other, a plurality of gauges in each section and arranged in groups, said gauges having indicators including graduations and being revoluble whereby the graduations are readable in a direction transversely of the housing, a cover plate for each section with transparent covered openings rendering the graduations visible, each cover plate being slidably removable to render the gauges accessible.

9. A gauge housing having a multiple of gauges mounted therein co-axially including indicators having readings visible through the housing in a direction transversely thereof, and illuminating means on the interior of the housing to illuminate all the readings simultaneously, the front of the housing having transparencies rendering the readings visible.

10. A multiple of gauges, a housing in which the gauges are mounted co-axially, and internally attached illuminating means within the housing, a protector of transparency for the illuminating means, whereby the readings of the multiple of gauges are illuminated.

11. A multiple of gauges, a housing in which the gauges are mounted co-axially, and internally attached illuminating means within the housing, a protector of transparency for the illuminating means, whereby readings of the multiple of gauges are illuminated, said protector of transparency having means of ventilating its interior.

12. In a gauge, the combination of a multiple of gauges arranged in series, each series comprising a plurality of gauges, of a housing for said gauges, said housing comprising a plurality of sections, each containing a series of gauges, supporting brackets, one for each section, and means for mounting the section in said brackets to allow the removal of one section without removing the other section.

13. In a gauge as set forth, a multiple of gauges, a housing provided with an approximate longitudinal center common to the centers of the gauges, and means to permit fluid under pressure in the housing to escape in the event of accident to the gauge parts.

14. In a device as set forth, the combination of a plurality of brackets provided with correspondingly projecting arms, of a gauge housing comprising a plurality of sections positioned between the arms and provided with projecting elements, and means passing through the arms and the elements for mounting the sections on the brackets, whereby the sections are removable collectively or individually.

15. In a device as set forth, the combination of a plurality of brackets provided with correspondingly projecting arms, of a gauge housing comprising a plurality of sections positioned between the arms and provided with projecting elements, and means passing through the arms and the elements for mounting the sections on the brackets, whereby the sections are removable collectively or individually, said means passing through the arms and the elements comprising bolts, the removal of one or the other of which permitting either one or all the sections to swing horizontally on the remaining bolt.

16. A gauge housing comprising a multiple of sections, each containing a plurality of gauges, said sections being separably united, and a cover for closing either section on one end where it separates from the other sections.

17. A gauge housing comprising a multiple of sections and a plurality of dial pressure gauges in each section, the gauges in each section being mounted on a substantially longitudinal center common to all the gauges in the section.

18. In a gauge, the combination with a housing comprising a plurality of sections, and means for uniting the sections, whereby any one of the sections may be removed and used independently of the other section, and a cover common to and adapted for fastening to one end of either removed section.

19. In a gauge, a housing comprising a plurality of sections, a series of gauges common to and mounted coaxially in each of the sections.

20. In a gauge, a housing comprising a plurality of sections, a series of gauges common to and mounted co-axially in each of the sections, and means for uniting the sections, whereby any one of the sections may be removed and used independently with its respective gauges therein.

21. In a gauge, a housing comprising a plurality of sections, a series of gauges common to and mounted co-axially in each of the sections, and means for uniting the sections, whereby any one of the sections may be removed and used independently with its respective gauges therein, and a cover common to and for closing one end of either section.

22. In a gauge, a housing comprising a plurality of sections, a series of gauges common to and mounted co-axially in each of the sections, the front wall of the housing having a plurality of transparent covered openings, which render the reading of the gauges visible from a plurality of positions in front of the housing, said positions being common to the readings of each of the gauges.

23. In a gauge as set forth, a housing, its front wall having transparent covered openings, certain of which being offset from certain other of said openings, a pressure dial gauge having a plurality of corresponding readings offset out of alignment with each other and being visible from a plurality of positions in front of the housing and common to the offset openings.

In testimony whereof he affixes his signature.

CHAUNCEY D. ALLEN.